Figure 1:
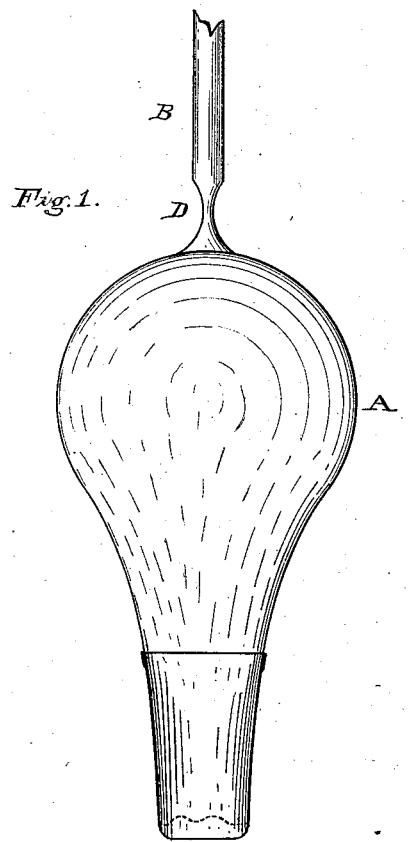

(No Model.)

W. HOLZER.
MANUFACTURE OF INCANDESCING ELECTRIC LAMPS.

No. 289,838. Patented Dec. 11, 1883.

ATTEST:
E. C. Rowland
H. W. Seely

INVENTOR.
William Holzer,
By Rich'd N. Dyer,
Atty.

United States Patent Office.

WILLIAM HOLZER, OF HARRISON, NEW JERSEY, ASSIGNOR, BY MESNE ASSIGNMENTS, TO THE EDISON LAMP COMPANY, OF SAME PLACE.

MANUFACTURE OF INCANDESCING ELECTRIC LAMPS.

SPECIFICATION forming part of Letters Patent No. 289,838, dated December 11, 1883.

Application filed March 30, 1883. (No model.)

*To all whom it may concern:*

Be it known that I, WILLIAM HOLZER, of Harrison, in the county of Hudson and State of New Jersey, have invented a new and useful Improvement in the Manufacture of Incandescing Electric Lamps, of which the following is a specification.

My invention relates to the formation by blowing of bulbs or enlargements upon glass tubes, and is especially applicable in manufacturing the glass parts of incandescing electric lamps; and said invention consists, principally, in the use in glass-blowing of a flexible air-tight covering for covering the open end of a tube upon which an enlargement is to be formed by blowing. To attach the exhaust-tube to the top of a lamp-globe, a hollow projection is first formed by softening the glass and punching it out from within, and a tube of the desired length is then welded upon this projection. A contraction has to be formed in the tube near its junction with the globe, where it to be sealed off after exhaustion. The glass at the ends of the globe and of the exhaust-tube is softened by heat, and these ends are placed in contact and welded together. To make an even joint, however, it is necessary to blow through the tube, so as to expand the softened glass at this point. The tube is then drawn out to form the contraction. Heretofore in blowing this enlargement the operator has blown directly into the lower end of the globe, the small upper end of the tube being left open. It has been found that in thus blowing through the lamp various foreign matters, moisture, and vapors, carried by the exhalations of the breath, are caused to enter the globe, which cannot be readily and completely removed by the exhausting process, and therefore remain in the lamp, impairing the vacuum and injuring the incandescing filament. To remedy this is one of the objects of my invention, and I accomplish such object by placing a flexible air-tight covering, preferably a rubber sleeve closed at one end, over the open lower end of the lamp. The blowing is then done through the exhaust-tube at the other end, and the globe being closed and filled with air, the foreign substances which in the former instance entered and remained within the globe are prevented from reaching it.

It is in the above process that I have mainly employed my invention. I may, however, use it also in blowing upon a tube which is to form the stem or wire support of a lamp the bulb or enlargement to which the globe is sealed. Heretofore it has been found necessary to soften and compress a portion of the tube before blowing into it, in order to close it. I however do away with this operation by placing the rubber sleeve upon the end of the tube, thus closing it air-tight.

It is evident that this invention may be employed in any case where it is desired to form an enlargement upon any open glass tube.

Figure 2:
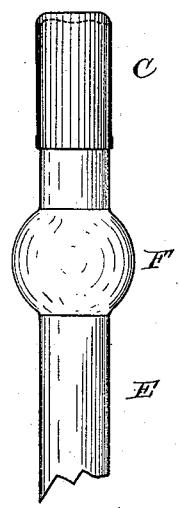

Said invention is illustrated in the accompanying drawings, in which Figure 1 is a view of a lamp-globe with the exhaust-tube attached and the flexible covering placed upon its lower end, and Fig. 2 a view showing my invention applied to a tube for forming the inner stem of the lamp.

A is a lamp-globe, and B its exhaust-tube. In attaching this exhaust-tube, the rubber sleeve C is placed over the lower end of the globe, and a bulb is blown at the point D, the tube being then drawn out to form the contraction shown.

E is a tube for forming the inner stem of a lamp. The rubber sleeve C is placed over its end, and the bulb or enlargement F blown upon the tube.

What I claim is—

1. In glass-blowing, a flexible air-tight covering for closing the end of a tube or other vessel upon which a bulb or enlargement is to be formed by blowing, substantially as set forth.

2. The combination, with a glass globe for forming the vacuum-chamber of an incandescing electric lamp, of a flexible air-tight covering closing its lower end, substantially as and for the purpose set forth.

This specification signed and witnessed this 21st day of March, 1883.

WILLIAM HOLZER.

Witnesses:
H. W. SEELY,
THOMAS H. HOWELL.